US009692496B2

(12) United States Patent
Nammi (10) Patent No.: US 9,692,496 B2
(45) Date of Patent: Jun. 27, 2017

(54) WIRELESS TERMINAL, METHOD THEREIN, COMPUTER PROGRAM AND COMPUTER-READABLE STORAGE MEDIUM

(71) Applicant: Telefonaktiebolaget L M Ericsson (publ), Stockholm (SE)

(72) Inventor: Sairamesh Nammi, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 14 days.

(21) Appl. No.: 14/784,551

(22) PCT Filed: Jan. 16, 2014

(86) PCT No.: PCT/SE2014/050045
§ 371 (c)(1),
(2) Date: Oct. 14, 2015

(87) PCT Pub. No.: WO2014/171877
PCT Pub. Date: Oct. 23, 2014

(65) Prior Publication Data
US 2016/0065285 A1    Mar. 3, 2016

Related U.S. Application Data

(60) Provisional application No. 61/812,276, filed on Apr. 16, 2013.

(51) Int. Cl.
*H04B 7/06*    (2006.01)
*H04W 72/04*   (2009.01)
(Continued)

(52) U.S. Cl.
CPC ........... *H04B 7/063* (2013.01); *H04B 7/0456* (2013.01); *H04B 7/0486* (2013.01);
(Continued)

(58) Field of Classification Search
None
See application file for complete search history.

(56) References Cited

U.S. PATENT DOCUMENTS

2008/0247364 A1* 10/2008 Kim ............... H04B 7/0671
                                              370/336
2012/0257664 A1* 10/2012 Yue ............... H04B 7/0452
                                              375/227

(Continued)

FOREIGN PATENT DOCUMENTS

WO    2008022243 A2    2/2008

OTHER PUBLICATIONS

Ericsson, "RP-111393: New WI: Four Branch MIMO transmission for HSDPA," 3rd Generation Partnership Project (3GPP), TSG-RAN meeting #53, Sep. 13-16, 2011, 6 pages, Fukuoka, Japan.
(Continued)

*Primary Examiner* — Eunsook Choi
(74) *Attorney, Agent, or Firm* — Withrow & Terranova, PLLC (57) ABSTRACT

Embodiments herein relate a wireless terminal for handling channel feedback for a channel from a radio base station to the wireless terminal in a MIMO system. The wireless terminal computes a Signal to Noise Ratio, SNR, or Signal to Interference plus Noise Ratio, SINR, for each entity in a precoding codebook for a plurality of transmission ranks. The wireless terminal either computes a capacity for each entity based on the computed SNR or SINR and then computes an averaged capacity by averaging the computed capacities for a plurality of layers; or the wireless terminal computes an averaged capacity for each entity based on an average of the computed SNR or SINR for a plurality of layers. Then the wireless terminal selects a preferred precoding control index, PCI, and a preferred transmission rank
(Continued)

as channel feedback, which preferred PCI and preferred transmission rank maximize the computed averaged capacity.

10 Claims, 10 Drawing Sheets

(51) Int. Cl.
   *H04B 7/04* (2017.01)
   *H04B 7/0456* (2017.01)
   *H04W 24/08* (2009.01)

(52) U.S. Cl.
   CPC ....... *H04W 24/08* (2013.01); *H04W 72/0466* (2013.01); *H04B 7/0639* (2013.01)

(56) References Cited

U.S. PATENT DOCUMENTS

| | | | | |
|---|---|---|---|---|
| 2014/0254508 A1* | 9/2014 | Krishnamurthy | .... | H04B 7/0417 370/329 |
| 2015/0131753 A1* | 5/2015 | Maruta | ................ | H04B 7/0473 375/267 |
| 2015/0139292 A1* | 5/2015 | Shirani-Mehr | ....... | H04L 5/0085 375/227 |

OTHER PUBLICATIONS

Huawei et al., "R1-121666: Layer Mapping with 2 Codewords," 3rd Generation Partnership Project (3GPP), TSG-RAN WG1 Meeting #68bis, Mar. 26-30, 2012, 6 pages, Jeju, Korea.

Nokia Siemens Networks, "R1-123717: Transport block interleaving for DL MIMO," 3rd Generation Partnership Project (3GPP), TSG RAN WG1 Meeting #70, Aug. 13-17, 2012, 2 pages, Qingdao, P.R. China.

TSG RAN WG1, "R1-124013: LS on RAN1 agreements on Four Branch MIMO transmission for HSDPA," 3rd Generation Partnership Project (3GPP), TSG RAN WG1 Meeting #70, Aug. 13-17, 2012, 2 pages, Qingdao, P.R. of China.

International Search Report and Written Opinion for International Patent Application No. PCT/SE2014/050045, mailed May 27, 2014, 13 pages.

Author Unknown, "Technical Specification Group Radio Access Network; Physical layer procedures (FDD) (Release 11)," Technical Specification 25.214, Version 11.4.0, 3GPP Organizational Partners, Dec. 2012, 127 pages.

Ericsson, "R1-111763: 4-branch MIMO for HSDPA," 3rd Generation Partnership Project (3GPP), TSG RAN WG1 Meeting #65, May 9-13, 2011, 17 pages, Barcelona, Spain.

* cited by examiner

WIRELESS TERMINAL, METHOD THEREIN, COMPUTER PROGRAM AND COMPUTER-READABLE STORAGE MEDIUM

This application is a 35 U.S.C. §371 national phase filing of International Application No. PCT/SE2014/050045, filed Jan. 16, 2014, which claims the benefit of U.S. Provisional Application No. 61/812,276, filed Apr. 16, 2013, the disclosures of which are incorporated herein by reference in their entireties.

TECHNICAL FIELD

Embodiments herein relate to a wireless terminal, a method therein, a computer program, and a computer-readable storage medium. In particular, embodiments herein relate to channel feedback from a wireless terminal in a Multiple Input Multiple Output (MIMO) system.

BACKGROUND

In a typical radio communications network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base stations without reporting to RNCs.

Currently a 4Tx transmissions scheme for High Speed Downlink Packet Access (HSDPA) is discussed within 3GPP standardization [1], [2]. Radio communications networks for packet based communication often use a retransmission protocol such as hybrid automatic repeat request (HARQ) on a physical layer to achieve greater reliability and robustness against the impairments of the radio channel. HARQ combines forward error correction (FEC) with automatic repeat request (ARQ) by encoding an information containing data block, also known as transport block (TB), in an encoder and then adding cyclic redundancy check (CRC) bits or other error detection bits to the coded bits output from the encoder. The coded data block is referred to as a codeword. If the data block is received without error, an acknowledgement (ACK) is sent to the transmitter indicating successful transmission of the data block and a new data block is transmitted. On the other hand, if the data block was not decoded correctly, a negative ACK (NACK) is sent by the receiver to request a retransmission. One fundamental issue with the four branch Multiple Input Multiple Output (MIMO) system is how many codewords/HARQ process identifiers this MIMO system should support. To reduce the signaling in uplink and downlink the radio communications network uses two HARQ process identifiers. Four codeword MIMO and two codeword MIMO are herein described in details. Note that codeword means, the blocks which have the same HARQ process identifier, same modulation and same transport block size, or code rate. It may be two transport blocks having the same HARQ process identifier and which are allocated same modulation and code rate, i.e. Transport block size.

Four Codeword MIMO

Figure 1:
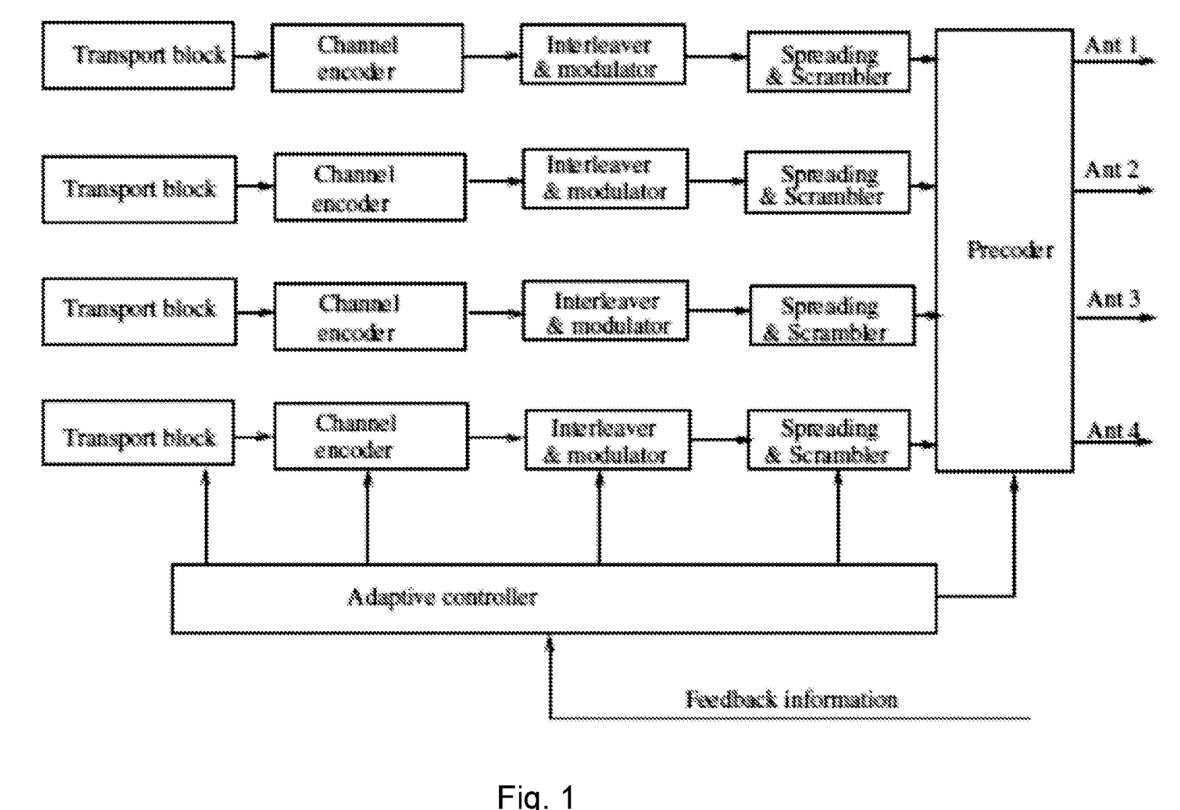
FIG. 1: shows a block diagram of four codeword-four branch MIMO system.

FIG. 1 is a block diagram of four codeword-four branch MIMO system and shows the transmission block diagram of a four codeword four branch MIMO system. This is an extension of Release-7 MIMO for HSDPA to four layers corresponding to the four branches. From the feedback information from the UE, the adaptive controller at the Node-B chooses the transmission rank (R), i.e. number of transmission layers, transport block length, modulation order and coding rate. Based on the feedback information taken into account in an adaptive controller, it also generates the precoding weight matrix (P). Observe that for this scheme coding and modulation is done independently for each stream. Hence one transport block (TB) is mapped to one codeword.

The information bits from the transport blocks are passed to the channel encoder and the output is interleaved and modulated in an interleaver and modulator for each stream. The output of the interleaver and modulator is mapped to the layers directly, i.e. symbols from each codeword are directly mapped to the corresponding layer. Once the layer mapping is done, the resultant symbols are spread and scrambled in a spreader and scrambler. Precoding is applied on the output of the spreader and scrambler in a precoder and the output signal is passed to the corresponding antenna ports.

The receiver transmits feedback of the channel to the transmitter wherein capacity maximization is found by summing up all the layers, which is optimal for four codeword MIMO system, however, summing of capacities may not be optimal in a MIMO system using a different number of codewords or a different relation between codewords and number of transmission layers.

SUMMARY

An object of embodiments herein is to provide feedback in a MIMO system in an efficient manner.

The object is achieved by providing a method in a wireless terminal for handling channel feedback for a channel. The channel being from a radio base station to the wireless terminal in a Multiple Input Multiple Output system. The wireless terminal computes a Signal to Noise Ratio, SNR, or Signal to Interference plus Noise Ratio, SINR, for each entity in a precoding codebook for a plurality of transmission ranks. Furthermore, the wireless terminal computes a capacity for each entity based on the computed SNR or SINR and then computes an averaged capacity by averaging the computed capacities for a plurality of layers. Alternatively, the wireless terminal computes an averaged capacity for each entity based on an average of the computed SNR or SINR for a plurality of layers. The wireless terminal then selects a preferred precoding control index, PCI, and a preferred transmission rank as channel feedback, which preferred PCI and preferred transmission rank maximize the computed averaged capacity.

The object is further achieved by providing a wireless terminal for handling channel feedback for a channel. The channel is from a radio base station to the wireless terminal in a Multiple Input Multiple Output system. The wireless terminal is configured to compute an SNR or SINR for each entity in a precoding codebook. The codebook being for a plurality of transmission ranks. The wireless terminal is either configure to compute a capacity for each entity based on the computed SNR or SINR and then to compute an averaged capacity by averaging the computed capacities for a plurality of layers; or to compute an averaged capacity for each entity based on an average of the computed SNR or SINR for a plurality of layers. The wireless terminal is further configured to select a preferred PCI and a preferred transmission rank as channel feedback, which preferred PCI and preferred transmission rank maximize the computed averaged capacity.

The object is further achieved by a computer program comprising instructions which, when executed on at least one processor, cause the at least one processor to carry out the method above.

The object is further achieved by a computer-readable storage medium, having stored thereon a computer program, comprising instructions. The instructions, when executed on at least one processor, cause the at least one processor to carry out the method above.

By computing an averaged capacity and to use this to select channel feedback gives improved performance in terms of link throughput as the channel feedback is reduced in terms of amount of data and also that the average is good enough as an estimate.

DETAILED DESCRIPTION

Figure 2:
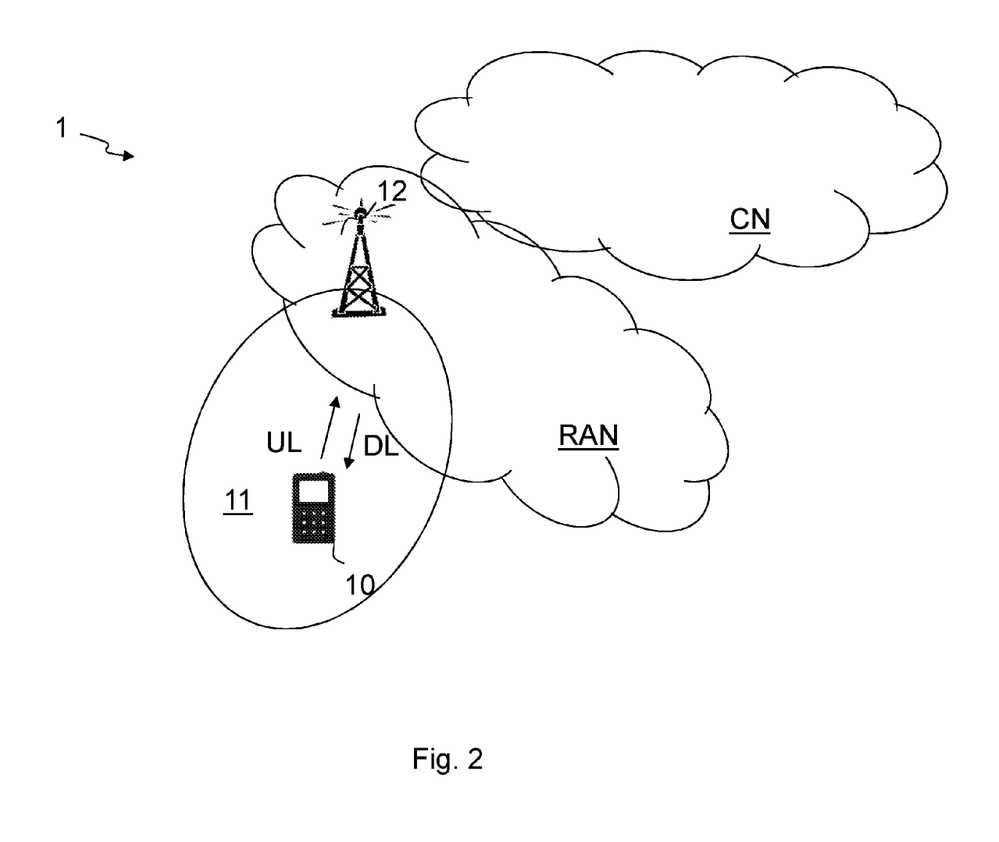
FIG. 2: shows a schematic overview depicting a radio communications network according to embodiments herein.

FIG. 2 is a schematic overview depicting a radio communications network 1. The radio communications network 1 comprises one or more RANs and one or more core networks (CN). The radio communications network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the radio communications network 1, a wireless terminal 10, also known as a mobile station and/or a user equipment, communicates via a Radio Access Network (RAN) to one or more CNs. It should be understood by the skilled in the art that "wireless terminal" is a non-limiting term which means any wireless terminal, Machine Type Communications (MTC) device or node e.g. Personal Digital Assistant (PDA), laptop, mobile, sensor, relay, mobile tablets or even a small base station communicating within respective cell.

The radio communications network 1 covers a geographical area which is divided into cell areas, e.g. a cell 11 being served by a radio base station 12. The radio base station 12 may also be referred to as a first radio base station. The radio base station 12 may be referred to as e.g. a NodeB, an evolved Node B (eNB, eNode B), a base transceiver station, Access Point Base Station, base station router, or any other network unit capable of communicating with a wireless terminal within the cell 11 served by the radio base station 12 depending e.g. on the radio access technology and terminology used. The radio base station 12 may serve one or more cells, e.g. the cell 11 and another cell.

A cell is a geographical area where radio coverage is provided by the radio base station equipment at a base station site of e.g. the radio base station 12. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole radio communications network 1 may also be broadcasted in the cell 11. The radio base station 12 communicates over the air or radio interface operating on radio frequencies with the wireless terminal 10 within range of the radio base station 12. The wireless terminal 10 transmits data over the radio interface to the radio base station 12 in Uplink (UL) transmissions and the radio base station 12 transmits data over an air or radio interface to the wireless terminal 10 in Downlink (DL) transmissions.

In some versions of the radio communications network 1, several base stations are typically connected, e.g. by landlines or microwave, to a controller node (not shown), such as a RNC or a BSC, which supervises and coordinates various activities of the plural base stations connected thereto. The RNCs are typically connected to one or more core networks.

Embodiments herein disclose a MIMO system, that is, the use of multiple antennas at both the transmitter and receiver to improve communication performance, which MIMO system uses e.g. 2 codewords and where channel feedback, i.e. a preferred precoding control index (PCI) and a preferred transmission rank, is selected to maximize a computed averaged capacity. The use of the average capacity leads to a more efficient feedback process requiring less amount of data signaled from a receiver.

First a two codeword MIMO mapping will be described.

Two Codeword MIMO

Figure 3:
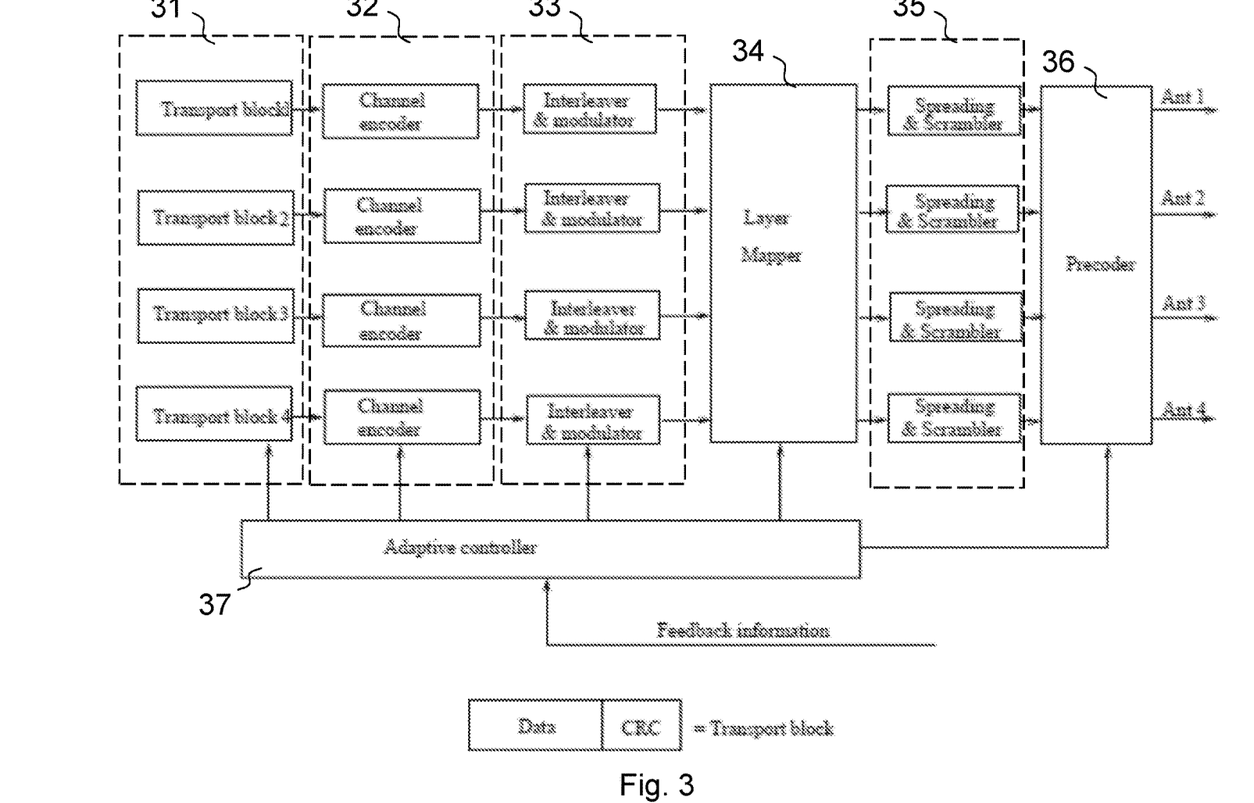
FIG. 3: shows a method in a wireless terminal according to embodiments herein.

FIG. 3 shows the block diagram of the two codeword with a layer mapper in a transmitter. A number of transport blocks 31 are encoded in a respective channel encoder 32. From the channel encoders 32 the outputs are interleaved and modulated in an interleaver and modulator 33 for each stream. The layer mapping functionality is introduced in a layer mapper 34 between the output of the interleaver and modulator 33 and the input of spreading and scramblers 35. Precoding is applied on the output of the spreading and scrambler 35 in a precoder 36 and the output signal is passed to the corresponding antenna ports, Ant1-Ant4. The TB comprises data and a CRC. From channel feedback, also referred to as the UE feedback information, an adaptive controller 37 chooses the transport block length, modulation order and the coding rate. It also generates the precoding weight information. Note that even though four channel encoders are used, the received feedback information corresponds to maximum two codewords, i.e. two HARQ processes identifiers. Note that according to the standard [3] for rank 1 and 2 transmissions, no layer mapping is needed. For rank 3 transmission, transport blocks 2 and 3 will have the same HARQ process id, while for rank 4 transmission, transport blocks 1 and 4 have the same HARQ process id, while transport blocks 2 and 3 will have the same HARQ process id.

It is not disclosed previously how feedback for four branch MIMO with two codewords should be structured or for any system where number of codewords differs from number of transmission layers. Introduction of 4-branch MIMO will require a new feedback channel structure to send parameters of channel feedback e.g. the Number of Transport Blocks Preferred (NTBP)/Channel Quality Indicator (CQI)/Precoding Control Index (PCI) information to the radio base station 12, such as a Node B, from the wireless terminal 10. Note that NTBP corresponds to preferred transmission rank. NTBP is equivalent to the number of independent channels between transmitter and receiver, which is also called rank information. Furthermore, note that the 3GPP standard does not specify how the wireless terminal 10 chooses these parameters of channel feedback. In general it is common to choose these parameters of channel feedback which maximize the sum capacity of each layer. Since in a two codeword MIMO, two layers uses the same modulation and transport block size, choosing rank information, and PCI using the sum capacity it has been noted that this may not be optimal. But instead, as suggested herein, a maximum of averaged capacities is used to select preferred PCI and preferred transmission rank.

In embodiments herein, two methods to provide channel feedback, by e.g. computing the number of transport blocks preferred, precoding control index and the modulation and the transport size information, in e.g. a two codeword MIMO with symbol interleaver are disclosed.

Figure 4:
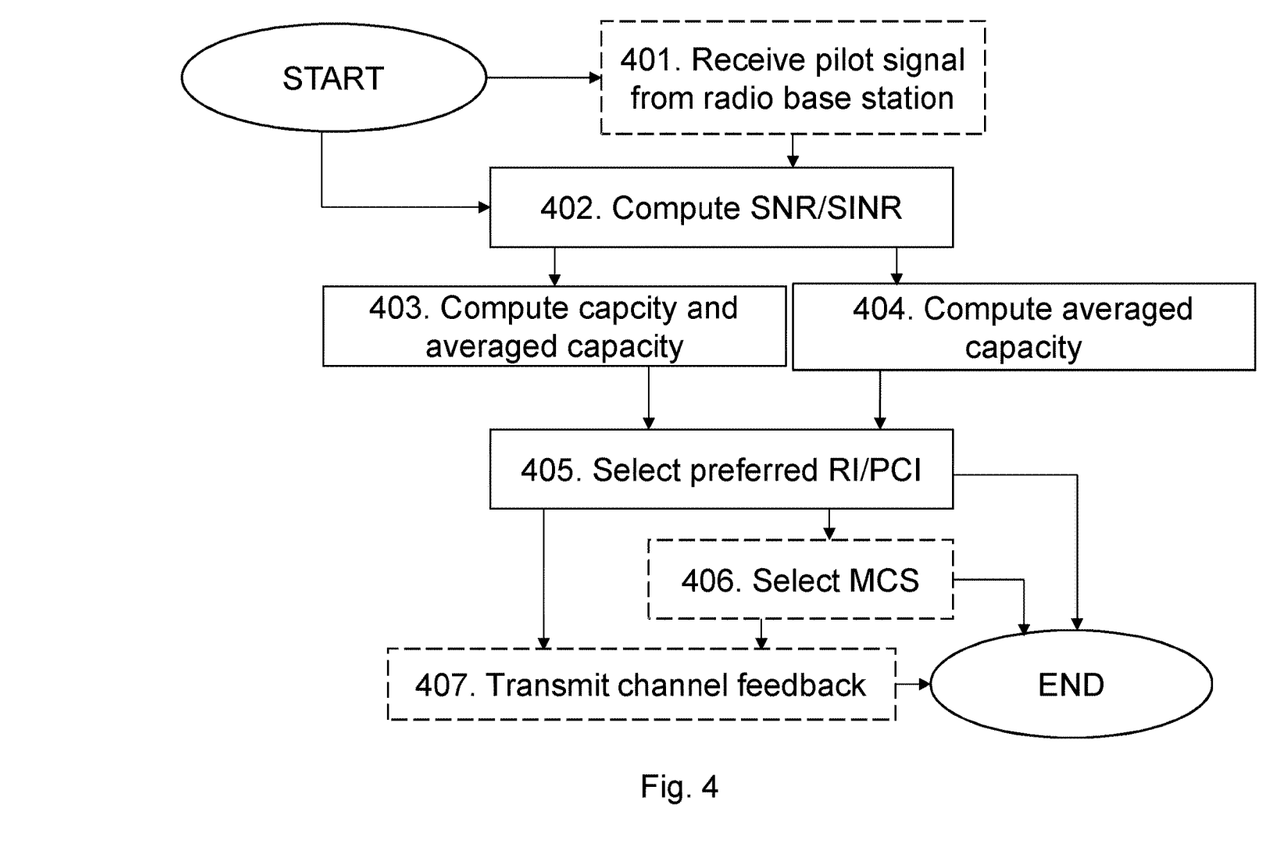
FIG. 4: shows a block diagram of the two codeword with a layer mapper.

According to embodiments herein methods are provided, methods in the wireless terminal 10 for handling channel feedback for a channel from a radio base station 12 to the wireless terminal 10 in a MIMO system, see FIG. 4. The MIMO system exemplified herein uses two codewords, but the MIMO system may use two or more codewords but less than the number of transmission layers, which means that the transport blocks over two out of a plurality of transmission layers have the same HARQ process identifier, i.e. the same codeword. Embodiments herein relate to a MIMO where there are more transmission layers than codewords, or HARQ identifiers.

Action 401. The wireless terminal 10 may receive a signal such as a pilot signal from the radio base station 12, the signal may be used for computing channel feedback of the channel from the radio base station 12.

Action 402. The wireless terminal 10 computes a SNR or SINR, for each entity in a precoding codebook for a plurality of transmission ranks. For example, based on the received signal.

Action 403. According to one alternative, the wireless terminal 10 computes a capacity for each entity based on the computed SNR or SINR, and then computes an averaged capacity by averaging the computed capacities for a plurality of layers. For example, averaging capacities for the layers using the same codeword. The wireless terminal 10 may compute the averaged capacity by averaging capacity of two layers out of at least four layers. The wireless terminal 10 may use the formula $C=\log 2(1+SNR \text{ (or SINR)})$, wherein C is the capacity, to compute the capacity.

Action 404. According to another alternative, the wireless terminal 10 computes an averaged capacity for each entity based on an average of the computed SNR or SINR for a plurality of layers. For example, averaging SNR or SINR for the layers using the same codeword and then compute the capacity for the averaged SNR or SINR, the computed capacity is also referred to as averaged capacity herein. The wireless terminal 10 may compute the averaged capacity by averaging computed SNR or SINR of two layers out of at least four layers. For example, averaging the SINR or SNR of a 1st layer and a 4th layer, and averaging the SINR or SNR of a 2nd layer and a 3rd layer. The wireless terminal 10 may use the formula $C=\log 2(1+SNR \text{ (or SINR)})$, wherein C is the capacity, to compute the capacity but wherein the SNR and the SINR are the average of the SINR and SNR.

Action 405. The wireless terminal 10 selects a preferred precoding control index, PCI, and a preferred transmission rank as channel feedback. The preferred PCI and preferred transmission rank maximize the computed averaged capacity.

Action 406. In some embodiments the wireless terminal 10 further selects a modulation and coding scheme based on the preferred PCI and the preferred transmission rank. The computed SNR or SINR may also be used to select the MCS from e.g. a table. Hence, the wireless terminal 10 may find the modulation and coding scheme in a table look up corresponding to the SNR or SINR, with the preferred PCI and preferred transmission rank.

Action 407. The wireless terminal 10 transmits, to the radio base station 12, the channel feedback. The channel feedback comprises preferred PCI, preferred transmission rank and/or the MCS.

Overview of Feedback Channel for Two Codeword MIMO

Figure 5:
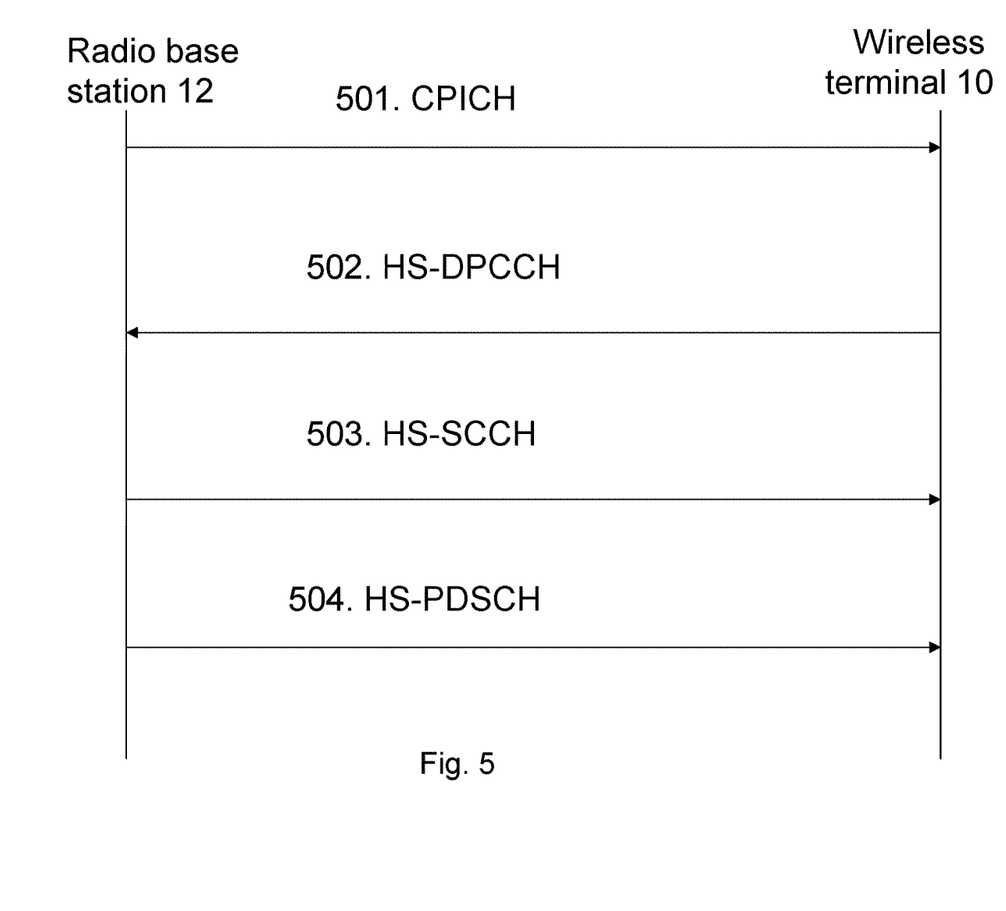
FIG. 5: shows a signaling scheme in a radio communication network.

FIG. 5 shows the messages, in an example using HSPA terminology, exchanged between the radio base station 12 and the wireless terminal 10 during typical data call set up.

Action 501. The radio base station 12 transmits a pilot signal over a Common Pilot Channel (CPICH).

Action 502. From the CPICH, the wireless terminal 10 estimates the channel and computes the channel quality information and precoding channel indicator according to embodiments herein. This information along with hybrid ARQ ACK/NAK is reported to the radio base station 12 using High Speed-Dedicated Physical Control Channel (HS-DPCCH). The periodicity of HS-DPPCH is one subframe, which is e.g. 2 msec.

According to embodiments herein a maximum of the averaged capacity gives the preferred PCI and preferred transmission rank. Furthermore, CQI may be encoded as follows.

$$CQI = \begin{cases} 15 \times CQI_1 + CQI_2 & \text{when 2, 3, or 4 transport blocks are preferred by the UE} \\ CQI_S & \text{when 1 transport block is preferred by the UE} \end{cases}$$

When the NTBP or transmission rank by the wireless terminal 10 is equal to four, $CQI_1$ indicates the supported transport format according to Table 7H, 7I, 7Ia or 7Ib of [3] for the primary and fourth transport blocks that could be received with the specified block error probability if it was transmitted with the preferred precoding matrix and $CQI_2$ indicates the supported transport format according to Table 7H, 7I, 7Ia or 7Ib of [3] for the second and third transport blocks that could be received with the specified block error probability if it was transmitted with the preferred precoding matrix.

When the NTBP or transmission rank by the wireless terminal 10 is equal to three, $CQI_1$ indicates the supported transport format according to Table 7H, 7I, 7Ia or 7Ib of [3] for the primary transport block that could be received with the specified block error probability if it was transmitted with the preferred precoding matrix and $CQI_2$ indicates the supported transport format according to Table 7H, 7I, 7Ia or 7Ib of [3] for the second and third transport blocks that could be received with the specified block error probability if it was transmitted with the preferred precoding matrix.

When the NTBP or transmission rank by the wireless terminal 10 is equal to two, $CQI_1$ indicates the supported transport format according to Table 7H, 7I, 7Ia or 7Ib of [3] for the primary transport block that could be received with the specified block error probability if it was transmitted with the preferred precoding matrix and $CQI_2$ indicates the supported transport format according to Table 7H, 7I, 7Ia or 7Ib of [3] for the second transport block that could be received with the specified block error probability if it was transmitted with the preferred precoding matrix. When the NTBP or transmission rank by the wireless terminal 10 is equal to one, $CQI_S$ indicates the supported transport format according to Table 7C, 7D, 7F or 7G of [3] for the transport block that could be received with the specified block error probability if it was transmitted with the preferred precoding vector.

Action 503. Once the radio base station 12 receives this information, it allocates the required channelization codes, modulation and coding, precoding channel index to the wireless terminal 10 after scheduling. This information is conveyed to the wireless terminal 10 by High Speed-Shared Control Channel (HS-SCCH).

Action 504. Once the wireless terminal 10 detects the HS-SCCH, downlink transmission starts through data traffic channel using High Speed-Physical Downlink Shared Channel (HS-PDSCH) from the radio base station 12.

Figure 6:
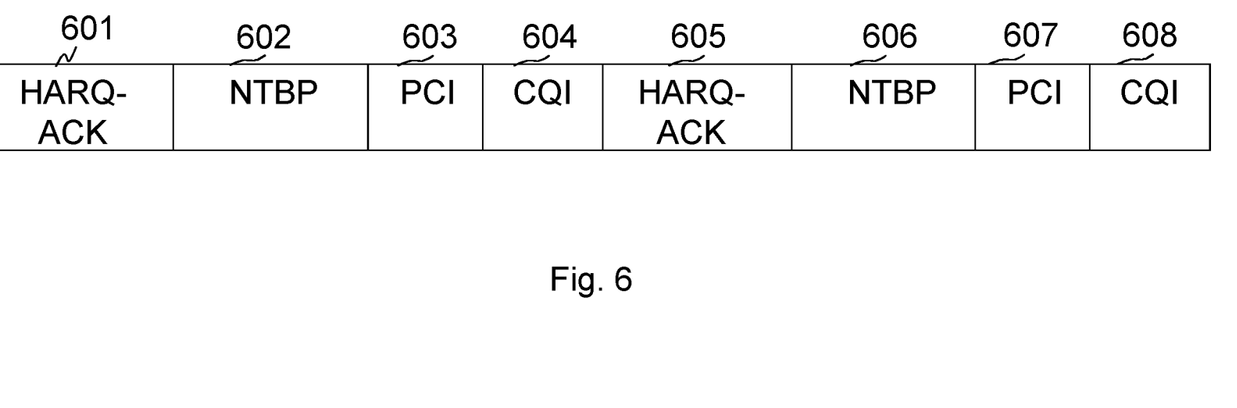
FIG. 6: shows a High Speed-Dedicated Physical Control Channel (HS-DPCCH) structure for single carrier in a two codeword MIMO.

The structure of HS-DPCCH for a single carrier is shown in FIG. 6. FIG. 6 shows a HS-DPCCH structure for single carrier in a two codeword MIMO. The wireless terminal 10 transmits the channel feedback carrying preferred PCI and preferred transmission rank, also called NTBP. The structure may comprise an HARQ ACK field 601, a NTBP field 602, a PCI field 603 and a CQI field 604 for a first codeword. The structure may further comprise a second HARQ ACK field 605, a second NTBP field 606, a second PCI field 607 and a second CQI field 608 for a second codeword.

Figure 7:
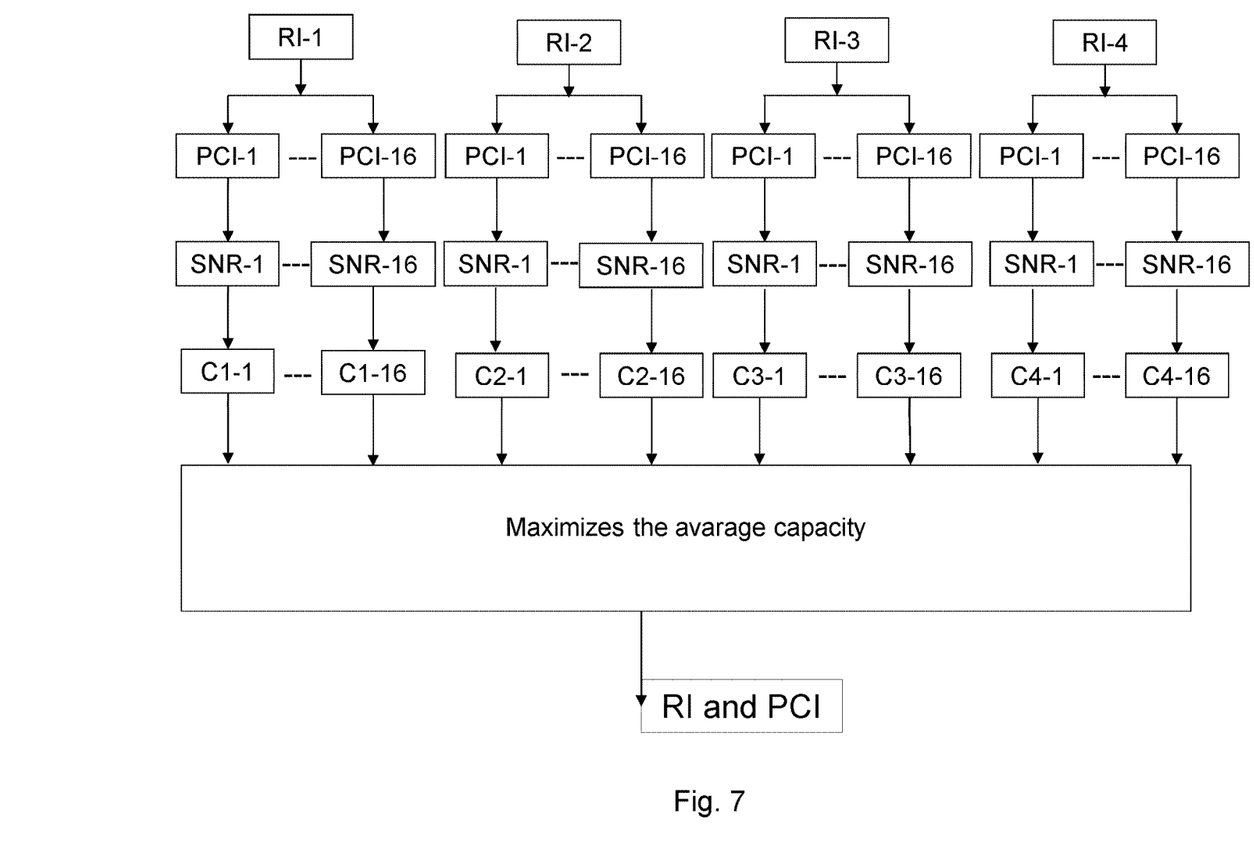
FIG. 7: shows a block diagram how to find RI and PCI for a four transmit antenna system.

RI/PCI Selection Algorithm, Exhaustive Approach,

FIG. 7 shows the pictorial view for finding NTBP or transmission rank, and PCI for a four transmit antenna system using capacity. The precoding codebook for a plurality of transmission layers is shown in Table 1 and comprises 16 elements for each rank or transmission rank. The quantity $W_n^{\{s\}}$ denotes the matrix defined by the columns given by the set $\{s\}$ from the expression $W_n = I - 2u_n u_n^H / u_n^H u_n$ where I is the 4×4 identity matrix and the vector $u_n$ is given by Table 1. FIG. 7 is a pictorial view of PCI/RI selection in the conventional selection algorithm (Exhaustive search), however, according to embodiments herein the capacity checked is the averaged capacity of a plurality of layers.

The SINR at the output of the MIMO detector, minimum mean-square error (MMSE), maximum likelihood detection (MLD) etc., is a function of channel matrix H, precoding matrix, the noise power spectral density and the co-channel interference power.

The algorithm for finding RI/PCI may in previously known systems be as follows wherein a wireless terminal:
1. Computes the channel coefficients by estimating the channel.
2. Computes the SNR for each entity, in the precoding codebook.
3. Computes the capacity of each entity using the formula $C = \log 2(1+SNR)$ 4. Finds the precoding control index and the corresponding RI which maximizes the sum capacity

TABLE 1

PRECODING INFORMATION

| $x_{pwipb,1}$, $x_{pwipb,2}$, $x_{pwipb,3}$, $x_{pwipb,4}$, $u_n$ | | Number of transport blocks | | | |
|---|---|---|---|---|---|
| | | 1 | 2 | 3 | 4 |
| 0000 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 0001 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |

TABLE 1-continued

PRECODING INFORMATION

| $x_{pwipb, 1}$, $x_{pwipb, 2}$, $x_{pwipb, 3}$, $x_{pwipb, 4}$, $u_n$ | | Number of transport blocks | | | |
|---|---|---|---|---|---|
| | | 1 | 2 | 3 | 4 |
| 0010 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 0011 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 0100 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 0101 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 0110 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 0111 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 1000 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 1001 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 1010 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 1011 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 1100 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 1101 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 1110 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 1111 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Proposed RI/PCI Selection Algorithm for Two Codeword MIMO

Since in two codeword MIMO, the transport blocks 1 and 4 and transport blocks 2 and 3 need to have the same channel quality. Embodiments herein propose the following algorithm to find the RI/PCI.

1. wireless terminal 10 computes the channel coefficients by estimating the channel.
2. wireless terminal 10 computes the SNR for each entity in the precoding codebook. E.g. each element in the precoding codebook, in total 64 for 4×4 MIMO.
3. wireless terminal 10 computes the capacity of each entity using the formula $C = \log 2(1+SNR)$ 4. wireless terminal 10 averages the capacities for layers 1 and 4, and do the average of the capacities for layers 2 and 3.
5. wireless terminal 10 finds the precoding control index (PCI) and the corresponding RI which maximizes the capacity.
6. wireless terminal 10 finds the modulation and coding scheme corresponding to the capacity found in 4, with the RI and PCI found in 5 using look up table.

In another embodiment the following actions may be performed to select modulation and coding scheme.

1. wireless terminal 10 computes the channel coefficients by estimating the channel.
2. wireless terminal 10 computes the SINR or SNR for each entity in the precoding codebook.
3. wireless terminal 10 averages the SINRS or SNR of $1^{st}$ and $4^{th}$ layers, and do the average the SINRs or SNR of $2^{nd}$ and $3^{rd}$ layers.
4. wireless terminal 10 computes the capacity of each entity using the formula $C = \log 2(1+SNR)$ for each codeword.

5. wireless terminal 10 finds the precoding control index (PCI) and the corresponding RI which maximizes the capacity.
6. wireless terminal 10 finds the modulation and coding scheme corresponding to the capacity found in 4, with the RI and PCI found in 5 using look up table.

For each transmission rank e.g. transmission rank 1, RI-1, embodiments herein may determine PCI-1-PCI-16 from computed SNR-1-SNR-16 and averaged capacity C1-1-C1-16 to determine which preferred transmission rank and preferred PCI that maximize the capacity or the averaged capacity. An advantage is that the method mentioned herein gives improved performance in terms of link throughput.

Figure 8:
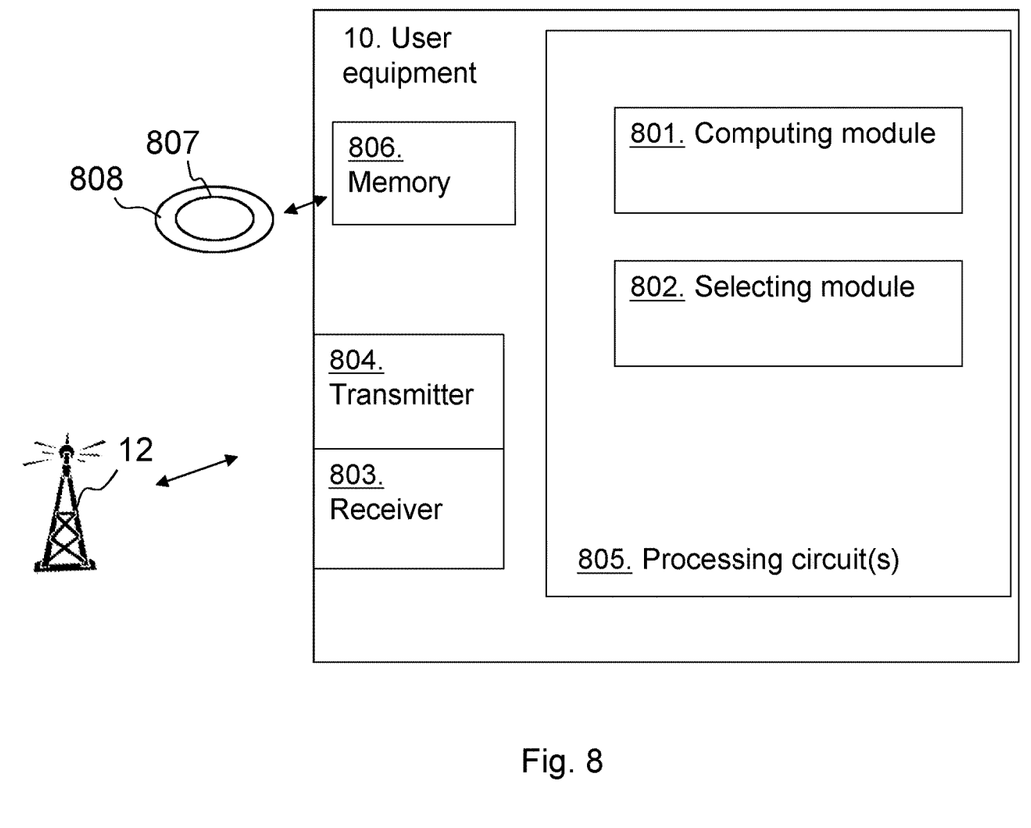
FIG. 8: shows a block diagram depicting a wireless terminal according to embodiments herein.

According to some embodiments herein the wireless terminal 10 is provided, shown in FIG. 8, for handling channel feedback for a channel from the radio base station 12 to the wireless terminal 10 in a MIMO system. The MIMO system may use two codewords, i.e. the transport blocks of two layers out of 3 or 4 layers has the same HARQ process identifier.

The wireless terminal 10 is configured to compute a SNR or SINR, for each entity in a precoding codebook for a plurality of transmission ranks. The wireless terminal 10 may e.g. comprise a computing module 801 configured to compute a SNR or SINR, for each entity in a precoding codebook for a plurality of transmission ranks. The wireless terminal 10 is configured to compute a capacity for each entity based on the computed SNR or SINR and then to compute an averaged capacity by averaging the computed capacities for a plurality of layers, or to compute an averaged capacity for each entity based on an average of the computed SNR or SINR for a plurality of layers. The computing module 801 may e.g. be configured to compute the average capacity. The wireless device 10 and/or the computing module 801 may further be configured to average capacity or computed SNR or SINR of two layers out of at least four layers. E.g. the wireless device or the computing module may further be configured to average capacity or SNR or SINR of a $1^{st}$ layer and a $4^{th}$ layer, and to average the capacity or SINR or SNR of a $2^{nd}$ layer and a $3^{rd}$ layer.

The wireless terminal 10 is configured to select a preferred precoding control index, PCI, and a preferred transmission rank as channel feedback, which preferred PCI and preferred transmission rank maximize the computed averaged capacity, e.g. by comprising a selecting module 802 configured to select the preferred PCI and the preferred transmission rank as channel feedback. The wireless terminal 10 may be configured to select a modulation and coding scheme based on the preferred PCI, the preferred transmission rank and e.g. SNR or SINR. For example, the mobile terminal 10 may comprise the selection module 802 configured to select MCS based on the preferred PCI, the preferred transmission rank and e.g. SNR or SINR.

The wireless terminal 10 or the computing module 801 may be configured to compute the capacity or the average capacity by using the formula C=log 2(1+SNR), wherein C is the capacity or the average capacity.

The wireless terminal 10 or the selecting module 802 may be configured to select the modulation and coding scheme by finding modulation and coding scheme in a table look up corresponding to the SNR or SINR, with the preferred PCI and preferred transmission rank.

The wireless terminal 10 comprises a receiver 803 that may be configured to receive a signal such as a pilot signal from the radio base station 12.

The wireless terminal 10 comprises a transmitter 804 that may be configured to transmit, to the radio base station 12, the channel feedback, which channel feedback comprises at least the preferred PCI, and the preferred transmission rank.

The embodiments herein for handling channel feedback may be implemented through one or more processors, such as a processing circuit 805 in the wireless terminal 10 depicted in FIG. 8, together with computer program code for performing the functions and/or method actions of the embodiments herein. The program code mentioned above may also be provided as a computer program product, for instance in the form of a data carrier carrying computer program code for performing embodiments herein when being loaded into the wireless terminal 10. One such carrier may be in the form of a CD ROM disc. It is however feasible with other data carriers such as a memory stick. The computer program code may furthermore be provided as pure program code on a server and downloaded to the wireless terminal 10.

The wireless terminal 10 further comprises a memory 806. The memory 806 may comprise one or more memory units and may be used to store for example data such as SNR, capacities, averaged capacities, channel feedback parameters such as PCI/RI NTBP, CQI, application/s to perform the methods herein when being executed on the wireless terminal 10 or similar.

The methods according to the embodiments described herein for the wireless terminal 10 are respectively implemented by means of e.g. a computer program 807 or a computer program product, comprising instructions, i.e., software code portions, which, when executed on at least one processor, cause the at least one processor to carry out the actions described herein, as performed by the wireless terminal 10. The computer program 807 may be stored on a computer-readable storage medium 808, e.g. a disc or similar. The computer-readable storage medium 808, having stored thereon the computer program, may comprise the instructions which, when executed on at least one processor, cause the at least one processor to carry out the actions described herein, as performed by the wireless terminal 10. In some embodiments, the computer-readable storage medium may be a non-transitory computer-readable storage medium.

Figure 9:
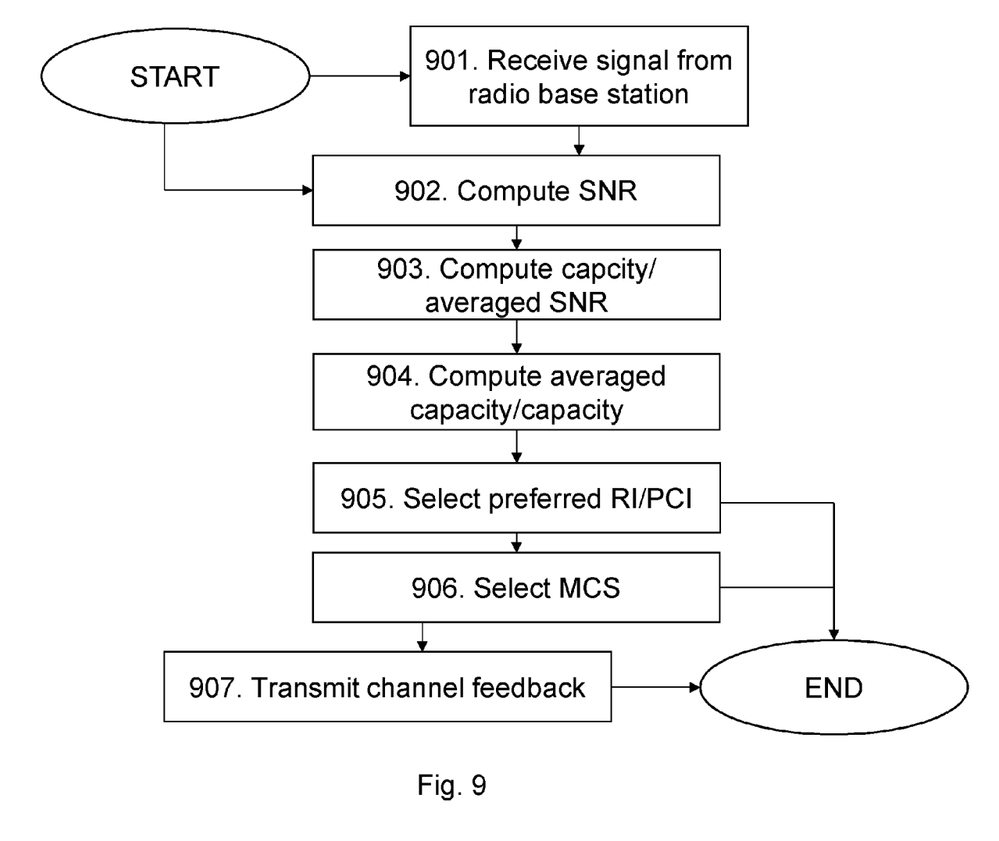
FIG. 9: shows a method in a wireless terminal according to some embodiments herein.

The method actions in the wireless terminal 10 for providing channel feedback to the radio base station 12 in the radio communications network 1 according to some embodiments will now be described with reference to a flowchart depicted in FIG. 9. The actions do not have to be taken in the order stated below, but may be taken in any suitable order. The method exemplified is for a MIMO system with at least four layers and with two codewords.

Action 901. The wireless terminal 10 may receive a signal such as a pilot signal from the radio base station 12. The action corresponds to the action 401 in FIG. 4.

Action 902. The wireless terminal 10 computes a SNR or SINR for each entity in the precoding codebook. The action corresponds to the action 402 in FIG. 4.

Action 903. The wireless terminal 10 computes a capacity for each entity based on the computed SNR or according to some embodiments based on an average of computed SNR or SINR Action 904. According to some embodiments herein, the wireless terminal 10 averages capacity of two layers out of the at least four layers. E.g. the capacity for layer 1 is averaged with the capacity for layer 4, and the capacity for layer 2 is averaged with the layer 3. That is, the wireless terminal 10 computes an averaged capacity from the computed capacities of two layers.

Action 905. The wireless terminal 10 selects or finds a preferred precoding control index (PCI) and a corresponding preferred transmission rank, e.g. a RI, which maximizes a possible capacity. The action corresponds to the action 405 in FIG. 4.

Action 906. The wireless terminal 10 may then select a modulation and coding scheme (MCS) based on the averaged capacity in action 704, (or the computed capacity in action 703), and the preferred PCI and preferred RI. E.g. the MCS is found in a table look up corresponding to the averaged capacity Action 704, (or the computed capacity in Action 703), with the preferred PCI and preferred RI. The action corresponds to the action 406 in FIG. 4.

Action 907. The wireless terminal 10 may then transmit the channel feedback to the radio base station 12. E.g. the wireless terminal 10 transmits HARQ, such as ACK and NAK, preferred PCI/RI and MCS to the radio base station 12. The action corresponds to the action 407 in FIG. 4.

Previously the capacity maximization is found by summing up all the layers, which is optimal for four codeword MIMO, but in a two codeword MIMO, that summing of capacities may not be optimal as the amount of data in the channel feedback may be reduced when using two code words or using same HARQ ID for two or more layers. Capacity is proportional to the SINR and in a two codeword MIMO simple summation does not represent the true capacity whereas the true SINR is closer with the average of the SINRs.

Figure 10:
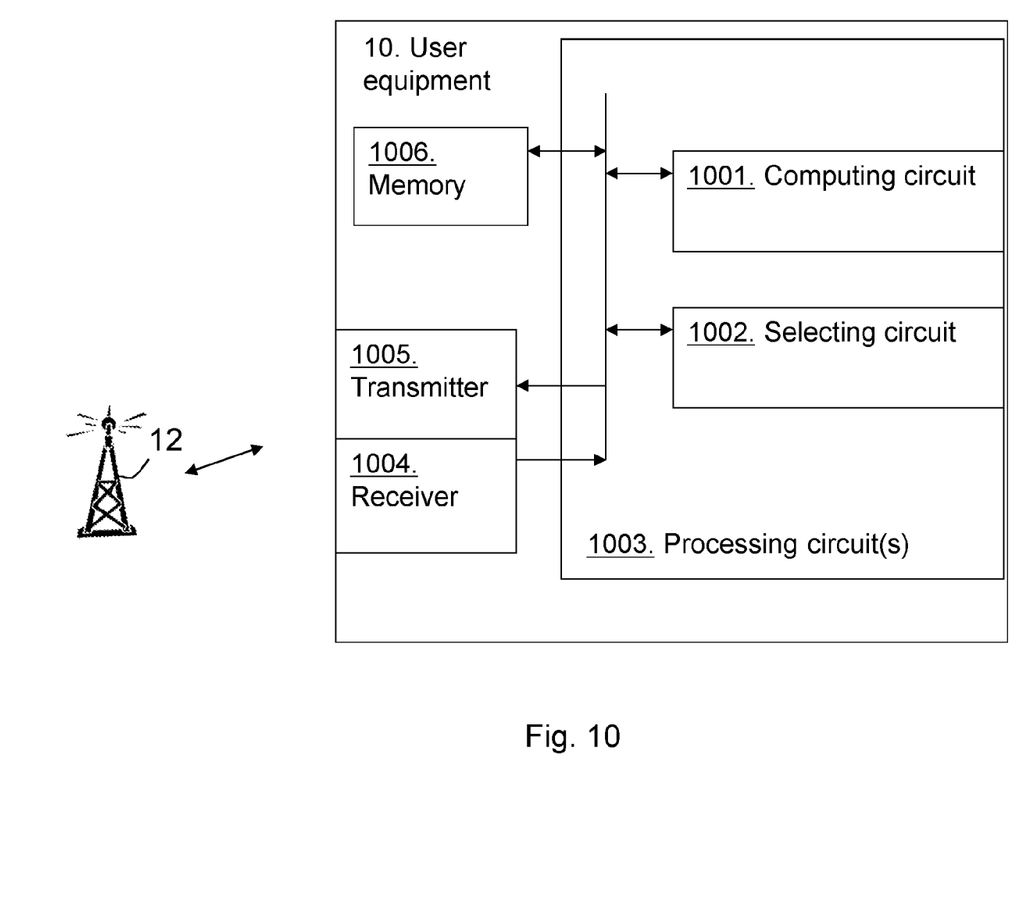
FIG. 10: shows a block diagram depicting a wireless terminal according to some embodiments herein.

In order to perform the method according to embodiments above a wireless terminal 10 is provided. FIG. 10 shows a block diagram depicting the wireless terminal 10 for handling channel feedback in the radio communications network according to some embodiments.

The wireless terminal comprises computing circuitry 1001 configured to compute e.g. channel coefficients by estimating the channel, the SNR or SINR for each entity in the precoding codebook, a capacity of each entity using the formula C=log 2(1+SNR); and to average the capacities for layer 1 and layer 4 and to average the capacities for layer 2 and layer 3. Alternatively or additionally, the capacity may be computed on an average of the SNR or SINR.

The wireless terminal may further comprise selecting circuitry 1002 configured to find the precoding control index and the corresponding RI which maximizes the capacity; and/or to find the modulation and coding scheme corresponding to the averaged capacity or computed capacity with the found RI and PCI using look up table.

The embodiments herein for obtaining channel feedback may be implemented through one or more processors, such as processing circuitry 1003 in the wireless terminal 10 depicted in FIG. 8, together with computer program code for performing the functions and/or method actions of the embodiments herein. The program code mentioned above may also be provided as a computer program product, for instance in the form of a data carrier carrying computer program code for performing embodiments herein when being loaded into the wireless terminal 10. One such carrier may be in the form of a CD ROM disc. It is however feasible with other data carriers such as a memory stick. The computer program code may furthermore be provided as pure program code on a server and downloaded to the wireless terminal 10.

Furthermore, the wireless terminal 10 further comprises a receiver 1004 configured to receive e.g. a pilot signal from the radio base station 12. The wireless terminal also comprises a transmitter 1005 configured to transmit channel feedback to the radio base station 12.

The wireless terminal 10 further comprises a memory 1006. The memory 806 may comprise one or more memory units and may be used to store for example data such as SNR, capacities, averaged capacities, channel feedback parameters such as PCI/RI NTBP, CQI, application/s to perform the methods herein when being executed on the wireless terminal 10 or similar.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Note that although terminology from 3GPP High Speed Downlink Packet Access (HSDPA) has been used in this disclosure to exemplify embodiments herein, this should not be seen as limiting possible embodiments to only the aforementioned system. Other wireless systems, including LTE, LTE-A, WiMax, UMB and GSM, may also benefit from exploiting the ideas covered within this disclosure.

Also note that terminology such as NodeB and wireless terminal should be considering non-limiting and does in particular not imply a certain hierarchical relation between the two; in general "NodeB" could be considered as device 1 and "wireless terminal" device 2, and these two devices communicate with each other over some radio channel. Herein, we also focus on wireless transmissions in the downlink, but embodiments disclosed herein are equally applicable in the uplink.

The object is achieved by a method in a wireless terminal for determining feedback to a radio base station in a MIMO system using two codewords. The wireless terminal averages capacities for a plurality of layers, e.g. for two layers. The wireless terminal may alternatively or additionally average SNR or SINR of two layers to find capacity. The wireless terminal selects preferred transmission rank and precoding control index to maximize capacities. Furthermore, a modulation and coding scheme (MCS) may be selected based on the averaged capacity or the computed capacity, based on averaged SNR or SINR, and the selected preferred transmission rank and precoding control index.

Hence, a preferred PCI and a preferred RI may be selected based on an average capacity of a plurality of layers, e.g. an average of capacities for layer 1 and layer 4, and an average of capacities layer 2 and layer 3.

The capacity maximization is found in a two codeword MIMO system by using average of capacities or an average operation to obtain the capacities of two layers leading to an improved performance in terms of link throughput as opposed to summing up the capacities.

A wireless terminal configured to perform the method is also herein provided.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

Abbreviations

MIMO Multiple input multiple output
HSDPA High Speed Downlink Packet Access
HSPA High Speed Packet Access
HS-SCCH High speed shared control channel
HS-PDSCH High speed Physical data shared channel
HARQ Hybrid automatic repeat request
UE User Equipment
TTI Transmit Time Interval
PCI Precoding control index
Tx Transmitter
LPN Low Power Node
L1 Layer 1
RRU Remote Radio Unit
RNC Radio Network Controller
DL Downlink
WCDMA Wideband Code Division Multiple Access
3GPP 3rd Generation Partnership Project
CPICH Common Pilot Channel
GSM Global System for Mobile (Communication)
LTE Long Term Evolution

REFERENCES

[1] RP-111393, "New WI: Four Branch MIMO transmission for HSDPA", Ericsson
[2] R1-111763, 4-branch MIMO for HSDPA, Ericsson
[3] 3GPP 25.214 version 11.4.0 section 6A.2.2

The invention claimed is:

1. A method in a wireless terminal for handling channel feedback for a channel from a radio base station to the wireless terminal in a Multiple Input Multiple Output, MIMO, system; the method comprising
computing a Signal to Noise Ratio, SNR, or Signal to Interference plus Noise Ratio, SINR, for each entity in a precoding codebook for a plurality of transmission ranks and a plurality of precoding control indices, PCIs, for each of the plurality of transmission ranks, wherein each entity corresponds to different rank and PCI combination;
computing a capacity for each entity based on the computed SNR or SINR and then computing, for each PCI, an averaged capacity by averaging the computed capacities for the PCI across a plurality of layers that corresponds to a subset of the plurality of transmission ranks, or computing, for each PCI across a plurality of layers that corresponds to a subset of the plurality of transmission ranks, an averaged capacity based on an average of the computed SNR or SINR for across the plurality of layers; and
selecting a preferred PCI and a preferred transmission rank as channel feedback, which preferred PCI and preferred transmission rank maximize the computed averaged capacity.

2. A method according to claim 1, wherein the MIMO system uses two codewords.

3. A method according to claim 1, further comprising selecting a modulation and coding scheme based on the preferred PCI, the preferred transmission rank.

4. A method according to claim 1, wherein the computing the averaged capacity comprises to average capacity or computed SNR or SINR of two layers out of at least four layers.

5. A method according to claim 1, wherein the computing the averaged capacity comprises to average capacity or SNR or SINR of a $1^{st}$ layer and a $4^{th}$ layer, and to average the capacity or SINR or SNR of a $2^{nd}$ layer and a $3^{rd}$ layer.

6. A wireless terminal for handling channel feedback for a channel from a radio base station to the wireless terminal in a Multiple Input Multiple Output, MIMO, system; the wireless terminal being configured to:
compute a Signal to Noise Ratio, SNR, or Signal to Interference plus Noise Ratio, SINR, for each entity in a precoding codebook for a plurality of transmission ranks and a plurality of precoding control indices, PCIs, for each of the plurality of transmission ranks, wherein each entity corresponds to different rank and PCI combination;
compute a capacity for each entity based on the computed SNR or SINR and then to compute, for each PCI, an averaged capacity by averaging the computed capacities for the PCI across a plurality of layers that corresponds to a subset of the plurality of transmission ranks, or to compute, for each PCI across a plurality of layers that corresponds to a subset of the plurality of transmission ranks, an averaged capacity based on an average of the computed SNR or SINR across the plurality of layers; and
select a preferred PCI and a preferred transmission rank as channel feedback, which preferred PCI and preferred transmission rank maximize the computed averaged capacity.

7. A wireless terminal according to claim 6, wherein the MIMO system uses two codewords.

8. A wireless terminal according to claim 6, further being configured to
select a modulation and coding scheme based on the preferred PCI, the preferred transmission rank.

9. A wireless terminal according to claim 6, further being configured to average capacity or computed SNR or SINR of two layers out of at least four layers.

10. A wireless terminal according to claim 6, further being configured to average capacity or SNR or SINR of a $1^{st}$ layer and a $4^{th}$ layer, and to average the capacity or SINR or SNR of a $2^{nd}$ layer and a $3^{rd}$ layer.

* * * * *